United States Patent
Lee (10) Patent No.: US 10,611,211 B2
(45) Date of Patent: Apr. 7, 2020

(54) SYSTEM AND METHOD FOR CONTROLLING AIR CONDITIONER FOR VEHICLE

(71) Applicant: GARIN SYSTEM Co., Ltd., Incheon (KR)

(72) Inventor: Yun Sub Lee, Incheon (KR)

(73) Assignee: GARIN SYSTEM CO., LTD., Incheon (KR)

( * ) Notice: Subject to any disclaimer, the term of this patent is extended or adjusted under 35 U.S.C. 154(b) by 166 days.

(21) Appl. No.: 15/893,923

(22) Filed: Feb. 12, 2018

(65) Prior Publication Data

US 2018/0244130 A1    Aug. 30, 2018

(30) Foreign Application Priority Data

Feb. 28, 2017   (KR) .................... 10-2017-0026289

(51) Int. Cl.
B60H 1/00          (2006.01)

(52) U.S. Cl.
CPC ..... B60H 1/00778 (2013.01); B60H 1/00657 (2013.01)

(58) Field of Classification Search
None
See application file for complete search history.

(56) References Cited

U.S. PATENT DOCUMENTS

| | | | | |
|---|---|---|---|---|
| 6,345,767 B1* | 2/2002 | Burrus, IV | ......... | B60H 1/00735 236/1 R |
| 6,357,244 B1* | 3/2002 | Mori | .................. | B60H 1/00642 165/202 |
| 6,745,582 B1* | 6/2004 | Urbank | .............. | B60H 1/00735 236/51 |
| 7,441,414 B2* | 10/2008 | Ziehr | ................. | B60H 1/00778 165/202 |
| 7,775,453 B2* | 8/2010 | Hara | .................. | B60H 1/00642 165/42 |

(Continued)

FOREIGN PATENT DOCUMENTS

KR   10-2013-0134582 A    12/2013

*Primary Examiner* — Jonathan M Dager
(74) *Attorney, Agent, or Firm* — Patent Office of Dr. Chung Park (57) ABSTRACT

A system for controlling an air conditioner for a vehicle includes a sensor group that generates environmental information, a gear mode sensing unit that senses a gear mode, a timer that counts time, a communication unit that receives a remote control signal and transmit air-conditioning control information, a control unit that generates a start-up control signal for a vehicle in response to the remote control signal or a set time, outputs or stops a start-up control signal in response to the gear mode, outputs an air-conditioning control signal when start-up is performed, performs transmission control through the communication unit by generating the air-conditioning control information, measures air-conditioning target deviation corresponding to the environmental information, and selectively performs preliminary air-conditioning control, a start-up device that performs start-up in response to the start-up control signal, and an air conditioner that performs air-conditioning control in response to the air-conditioning control signal.

6 Claims, 6 Drawing Sheets

(56) References Cited

U.S. PATENT DOCUMENTS

| | | | | |
|---|---|---|---|---|
| 7,823,399 B2* | 11/2010 | Egawa | B60H 1/00735 | 165/204 |
| 8,275,505 B2* | 9/2012 | Kumagai | B60H 1/00642 | 701/22 |
| 8,672,022 B2* | 3/2014 | Ostermeier | B60H 1/00778 | 165/202 |
| 9,002,568 B2* | 4/2015 | Datta | B60R 16/02 | 236/46 R |
| 9,062,617 B2* | 6/2015 | Mauti, Jr. | F02D 29/02 | |
| 9,085,216 B2* | 7/2015 | Takehisa | B60H 1/00742 | |
| 9,478,074 B2* | 10/2016 | Hubbard | G07C 5/008 | |
| 9,604,522 B2* | 3/2017 | Geissenhoener | B60H 1/00657 | |
| 9,682,609 B1* | 6/2017 | Dudar | B60H 1/00764 | |
| 9,738,287 B2* | 8/2017 | Bolger | B60W 50/0098 | |
| 9,862,246 B2* | 1/2018 | Kikuchi | B60H 1/00778 | |
| 9,862,250 B2* | 1/2018 | Galbas | B60H 1/00778 | |
| 9,914,462 B2* | 3/2018 | Porras | B60K 6/40 | |
| 9,994,175 B2* | 6/2018 | Maeshiro | B60S 1/023 | |
| 10,328,873 B2* | 6/2019 | Petersen | G06Q 10/06 | |
| 2004/0194479 A1* | 10/2004 | Umebayashi | B60H 1/00642 | 62/126 |
| 2004/0262068 A1* | 12/2004 | Matsubara | B60R 25/04 | 180/287 |
| 2005/0192724 A1* | 9/2005 | Hendry | B60H 1/00735 | 701/36 |
| 2005/0225175 A1* | 10/2005 | Maehara | B60W 10/06 | 307/10.1 |
| 2007/0119959 A1* | 5/2007 | Wieszt | B60H 1/005 | 236/1 C |
| 2007/0144723 A1* | 6/2007 | Aubertin | B60H 1/00642 | 165/202 |
| 2008/0117079 A1* | 5/2008 | Hassan | B60R 25/045 | 340/901 |
| 2008/0125935 A1* | 5/2008 | Chen | B60H 1/004 | 701/36 |
| 2008/0287074 A1* | 11/2008 | Grunhold | H04M 1/6091 | 455/90.2 |
| 2009/0025412 A1* | 1/2009 | Takehisa | B60H 1/00764 | 62/244 |
| 2009/0064695 A1* | 3/2009 | Kojima | B60H 1/0065 | 62/230 |
| 2009/0229288 A1* | 9/2009 | Alston | B60H 1/00428 | 62/236 |
| 2010/0023210 A1* | 1/2010 | Flick | B60H 1/004 | 701/36 |
| 2010/0072290 A1* | 3/2010 | Dage | B60H 1/00657 | 236/51 |
| 2010/0106363 A1* | 4/2010 | Mandujano | B60H 1/00657 | 701/36 |
| 2010/0132388 A1* | 6/2010 | Oyobe | B60H 1/004 | 62/157 |
| 2010/0206957 A1* | 8/2010 | Vyas | B60H 1/00657 | 236/46 R |
| 2010/0235046 A1* | 9/2010 | Proefke | B60H 1/00642 | 701/36 |
| 2011/0071734 A1* | 3/2011 | Van Wiemeersch | G08C 17/02 | 701/49 |
| 2011/0086668 A1* | 4/2011 | Patel | G08C 17/02 | 455/556.1 |
| 2011/0166734 A1* | 7/2011 | Ferguson | B60K 6/445 | 701/22 |
| 2011/0256904 A1* | 10/2011 | Simmons | B60R 25/00 | 455/556.1 |
| 2012/0047928 A1* | 3/2012 | Fukatsu | B60H 1/00392 | 62/150 |
| 2012/0101659 A1* | 4/2012 | Kim | B60H 1/00257 | 701/2 |
| 2012/0115446 A1* | 5/2012 | Gautama | G08C 17/02 | 455/414.1 |
| 2012/0116608 A1* | 5/2012 | Park | B60H 1/00657 | 701/2 |
| 2012/0267442 A1* | 10/2012 | Choi | G05D 23/1902 | 236/51 |
| 2012/0303178 A1* | 11/2012 | Hendry | B60R 16/037 | 701/2 |
| 2013/0079978 A1* | 3/2013 | Uyeki | B60H 1/00657 | 701/36 |
| 2013/0096734 A1* | 4/2013 | Tonegawa | B60H 1/00257 | 701/2 |
| 2013/0151132 A1* | 6/2013 | Harumoto | F02N 11/0807 | 701/113 |
| 2013/0271074 A1* | 10/2013 | Federico | G06F 7/00 | 320/109 |
| 2014/0081481 A1* | 3/2014 | Nishida | B60H 1/00771 | 701/2 |
| 2014/0100716 A1* | 4/2014 | Kawai | B60L 1/003 | 701/2 |
| 2014/0330453 A1* | 11/2014 | Nakagawa | B60H 1/00428 | 701/2 |
| 2015/0114016 A1* | 4/2015 | Ota | B60H 1/00778 | 62/133 |
| 2015/0120151 A1* | 4/2015 | Akay | B60R 25/24 | 701/49 |
| 2015/0127215 A1* | 5/2015 | Chatterjee | B60H 1/00657 | 701/36 |
| 2015/0129192 A1* | 5/2015 | Boss | B60H 1/00771 | 165/202 |
| 2015/0210287 A1* | 7/2015 | Penilla | B60W 40/08 | 701/49 |
| 2016/0144689 A1* | 5/2016 | Miller | B60H 1/00964 | 165/202 |
| 2016/0193895 A1* | 7/2016 | Aich | B60H 1/00657 | 165/202 |
| 2016/0207375 A1* | 7/2016 | Gauthier | B60H 1/00778 | |
| 2016/0244010 A1* | 8/2016 | Tseng | B60R 16/037 | |
| 2016/0347149 A1* | 12/2016 | Rustoni | B60H 1/00771 | |
| 2016/0368345 A1* | 12/2016 | Farooq | B60H 1/00778 | |
| 2017/0016266 A1* | 1/2017 | Van Wiemeersch | E05F 15/71 | |
| 2018/0001734 A1* | 1/2018 | Faust | B60H 1/00064 | |
| 2018/0009290 A1* | 1/2018 | Inui | B60H 1/00785 | |
| 2018/0222283 A1* | 8/2018 | Tamane | H04W 4/023 | |
| 2018/0334170 A1* | 11/2018 | Liu | F01N 3/2006 | |
| 2018/0345816 A1* | 12/2018 | Sakakibara | B60L 11/1875 | |
| 2018/0347531 A1* | 12/2018 | Tamane | F02N 11/0807 | |
| 2018/0347533 A1* | 12/2018 | Tamane | G05D 1/0011 | |
| 2019/0023223 A1* | 1/2019 | Yoo | B60R 25/102 | |

* cited by examiner

SYSTEM AND METHOD FOR CONTROLLING AIR CONDITIONER FOR VEHICLE

CROSS REFERENCE TO RELATED APPLICATION

The present application claims the benefit of Korean Patent Application No. 10-2017-0026289 filed in the Korean Intellectual Property Office on Feb. 28, 2017, the entire contents of which are incorporated herein by reference.

BACKGROUND OF THE INVENTION

1. Technical Field

The present invention relates to a technology for controlling an air conditioner for a vehicle and, more particularly, to a system and method for controlling an air conditioner for a vehicle, wherein preliminary air-conditioning control is performed in response to environmental information and an air-conditioning target.

2. Description of the Related Art

The Internet of Things (hereinafter referred to as the "IoT") is a computing system in which several technologies for connecting various devices based on the wireless Internet, obtaining environmental information through sensors, and performing control based on the obtained environmental information have been converged.

In such an IoT environment, an app can provide useful information and convenience to a user using several devices or apparatuses connected to a network. IoT devices may provide simple information or provide service according to the cooperation of a plurality of devices.

In this case, then IoT device that denotes the thing may include various embedded systems, such as home appliances, mobile equipment, computers and vehicles. Each thing includes an identification factor capable of identifying itself and a function capable of processing a communication function and data.

In an example in which an IoT device is applied to a vehicle, air-conditioning control of the vehicle may be performed through the IoT device. An air conditioner is an apparatus for increasing the comfortableness and comfort of a passenger within a vehicle and promoting safe driving while the vehicle runs, and can provide comfortableness to a passenger by properly maintaining a temperature, humidity and air environment according to a change of a surrounding environment.

The air conditioner for a vehicle may include a heater and an air conditioner, that is, a heating and cooling device for maintaining an indoor temperature to a proper level. The air conditioner operates in a fresh mode in which fresh air outside a vehicle is sucked and changed into air within the vehicle or a recycle mode in which air within the vehicle continues to circulate.

For control of the air conditioner for a vehicle, an indoor temperature sensor, an outdoor temperature sensor, an insolation sensor, a humidity sensor, an evaporator temperature sensor, a coolant temperature sensor and a poison gas detection sensor are disposed in the vehicle.

In such a system, air-conditioning control of the air conditioner for a vehicle is performed based on environmental information collected from the sensors.

Figure 1:
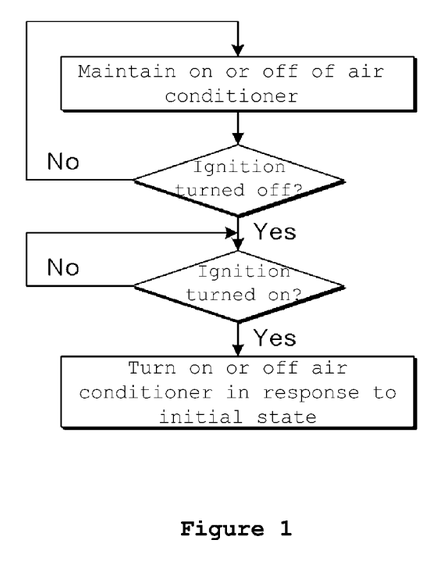
FIG. 1 is a flowchart of the existing air-conditioning control.

FIG. 1 is a flowchart of the existing air-conditioning control.

Referring to FIG. 1, upon stopping the start-up, air-conditioning control is performed on the heater or the air conditioner in response to the on/off state. That is, if the start-up of a vehicle has stopped in the state in which the heater has been turned on, the heater is turned on upon performing the remote start-up. If not, the heater maintains a turn-off state. The air conditioner also performs the same function.

That is, air-conditioning control may not be automatically performed by remote start-up.

Furthermore, there was proposed a technology for automatically performing air-conditioning control upon performing the remote start-up regardless of the on/off state of the heater or the air conditioner upon stopping the start-up.

However, the existing air-conditioning control simply provides only the function of turning on/off the heater or the air conditioner in response to remote start-up.

PRIOR ART DOCUMENT

Patent Document

Document 1. Korean Patent Application Publication No. 10-2013-0134582, "REMOTE CONTROL APPARATUS AND METHOD OF AIR CONDITIONER FOR VEHICLE"

SUMMARY OF THE INVENTION

Accordingly, the present invention has been made keeping in mind the above problems occurring in the prior art, and an object of the present invention is to provide a system and method for controlling an air conditioner for a vehicle, wherein environmental information is compared with an air-conditioning target and preliminary air-conditioning control can be selectively performed if, as a result of the comparison, air-conditioning target deviation is a set value or more.

A system for controlling an air conditioner for a vehicle according to an embodiment of the present invention includes a sensor group configured to generate environmental information, a gear mode sensing unit configured to sense a gear mode, a timer configured to count time, a communication unit configured to receive a remote control signal and transmit air-conditioning control information, a control unit configured to generate a start-up control signal for a vehicle in response to the remote control signal or a set time, output or stop a start-up control signal in response to the gear mode, output an air-conditioning control signal when start-up is performed, perform transmission control through the communication unit by generating the air-conditioning control information, measure air-conditioning target deviation corresponding to the environmental information, and selectively perform preliminary air-conditioning control, a start-up device configured to perform start-up in response to the start-up control signal, and an air conditioner configured to perform air-conditioning control in response to the air-conditioning control signal.

In this case, the control unit may include an air-conditioning target deviation measurement unit configured to measure air-conditioning target deviation based on the environmental information, time information and gear mode information, a start-up unit configured to generate the start-up control signal when the air-conditioning target deviation is a set value or more, and an air-conditioning intensity adjustment unit configured to generate the air-conditioning control signal in response to the start-up and adjust intensity of air-conditioning when the air-conditioning target deviation is the set value or more.

A method of controlling an air conditioner for a vehicle according to an embodiment of the present invention includes collecting environmental information, determining whether a current environment is capable of reaching a required air-conditioning target value on a set time through automatic start-up based on the environmental information, performing start-up if the current environment is incapable of reaching the required air-conditioning target value through the automatic start-up, and performing preliminary air-conditioning in response to the start-up.

In this case, the start-up may be performed only when a gear state is a parking mode or a neutral mode.

Furthermore, the preliminary air-conditioning may be performed within a set time of the automatic start-up time.

Air-conditioning control is performed along with the start-up at the automatic start-up time.

DETAILED DESCRIPTION

Hereinafter, embodiments of the present invention are described in detail with reference to the accompanying drawings, but it is presupposed that the same reference numerals denote the same elements.

In the detailed description or claims of the invention, when it is said that one element "includes" the other element, the word "include" should not be construed as including only the corresponding element, unless explicitly described to the contrary, but should be construed as further including other elements.

Furthermore, in the detailed description or claims of the invention, an element named "~means", "~unit", "~module" or "~block" means a unit for processing at least one function or operation, and each one may be implemented by software, hardware or a combination of them.

An embodiment of the present invention relates to a system which performs remote control, a tachograph and a self-diagnosis function used in a vehicle and enables vehicle control and the acquisition of information about the vehicle to be managed more easily and conveniently through a user terminal (e.g., a smartphone or a tablet) based on the IoT-based remote communication technology. Furthermore, an embodiment of the present invention relates to a system integration type convergence/complex technology in which independent controllers are integrated into a single controller (RDD-CTR) and functions are also united into a single app (RDD-App). More specifically, in remote control, such as vehicle start-up, air-conditioning control and door control, a short/remote distance communication module is mounted on an integrated controller (or control unit) so that control is made possible through Bluetooth communication in a short distance and control is made possible through WCDMA communication in a remote distance, and a vehicle is diagnosed, recorded and managed using the on board diagnostic (OBD2) function of the B-CAN and C-CAN of a vehicle CAN system. Furthermore, the system is configured so that pieces of collected information are provided to a user in real time using a Bluetooth communication module and pieces of collected air-conditioning information and vehicle driving information can be checked even in a remote distance through WCDMA communication.

Required data messages are extracted from messages transmitted and received between devices over a network controller area network (CAN) using a CAN system mounted on a vehicle. Furthermore, the extracted data messages are classified into messages capable of vehicle control and various pieces of information capable of diagnosing the state of the vehicle. That is, devices mounted on the vehicle use unique data messages depending on their locations and use. There is proposed the control unit mounted on the vehicle based on a database in which the messages have been classified into groups, for example, data messages that perform control of an air conditioner and control of the lock/unlock of a door and the turn on/off of an emergency light in the vehicle, state messages capable of checking the state of an engine and whether a door has been open or closed, and data messages, including answers to required questions such as the current fuel state, speed and the time during which the engine has been on, for each data message. Furthermore, machine to machine (M2M) is used to connect the control unit and a user terminal, that is, an external device. An IoT-based system for checking a problem in the vehicle by diagnosing remote control of the vehicle and a vehicle state using the user terminal in real time is implemented.

An embodiment of the present invention discloses a system regarding air-conditioning control.

Hereinafter, examples in which a system and method for controlling an air conditioner for a vehicle according to the present invention have been implemented are described in connection with specific embodiments.

Figure 2:
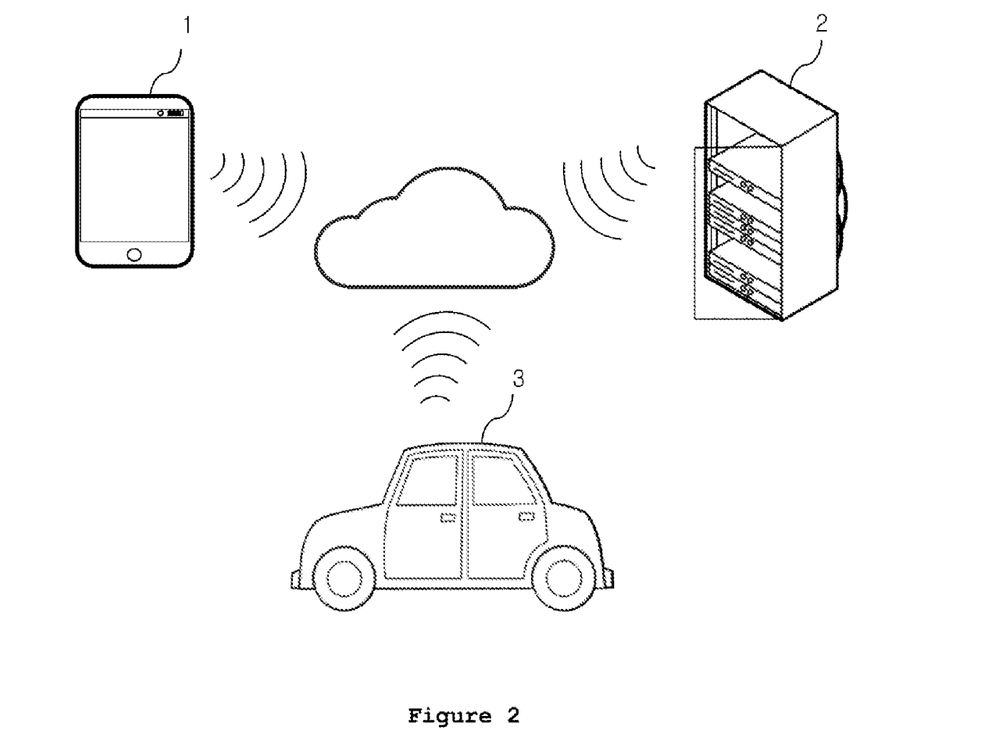
FIG. 2 shows a conceptual diagram of an overall system for control of an air conditioner for a vehicle according to an embodiment of the present invention.

FIG. 2 shows a conceptual diagram of an overall system for control of an air conditioner for a vehicle according to an embodiment of the present invention.

Referring to FIG. 2, the system according to an embodiment of the present invention includes a user terminal 1 (e.g., smartphone) configured to perform remote control and to receive air-conditioning control information, a server 2 configured to receive and store air-conditioning control information and vehicle driving information and to provide the user terminal 1 with air-conditioning control information and vehicle driving information, and a vehicle 3 subjected to remote control by the user terminal 1 and configured to generate air-conditioning control information and vehicle driving information and provide them to at least one of the server 2 and the user terminal 1, to measure air-conditioning target deviation corresponding to environmental information, and to selectively perform preliminary air-conditioning control.

The general system configured as described above according to an embodiment of the present invention may perform start-up control and air-conditioning control in response to remote control and may perform preliminary air-conditioning control in preparation for environmental information and an air-conditioning target.

Figure 3:
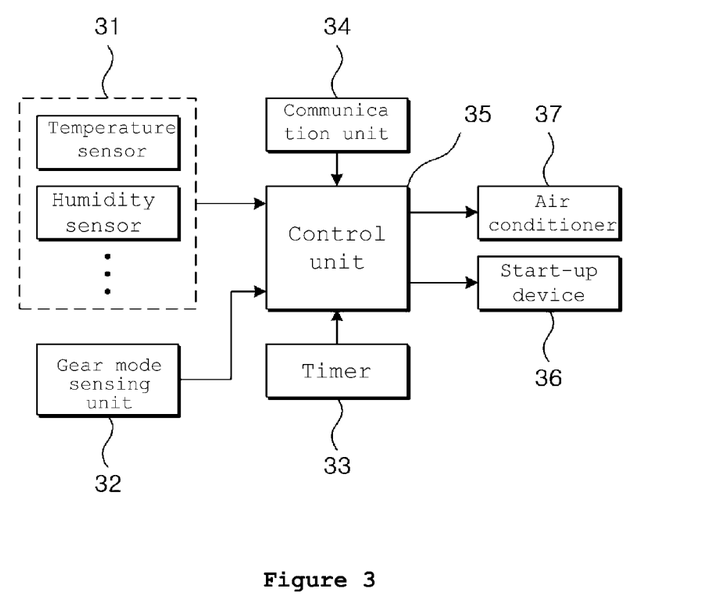
FIG. 3 shows the configuration of a system for controlling an air conditioner for a vehicle according to an embodiment of the present invention.

FIG. 3 shows the configuration of a system for controlling an air conditioner for a vehicle according to an embodiment of the present invention.

Referring to FIG. 3, the system for controlling an air conditioner for a vehicle according to an embodiment of the present invention includes a sensor group 31 configured to include a temperature sensor, a humidity sensor, etc. and generate environmental information, a gear mode sensing unit 32 configured to sense a gear mode, a timer 33 configured to count the time, a communication unit 34 configured to receive a remote control signal and transmit air-conditioning control information, a control unit 35 configured to generate a start-up control signal for the vehicle 3 in response to a remote control signal or set time, output or stop a start-up control signal in response to the gear mode, output an air-conditioning control signal when start-up is performed, perform transmission control through the communication unit 34 by generating air-conditioning control information, measure air-conditioning target deviation corresponding to environmental information, and selectively perform preliminary air-conditioning control, a start-up device 36 configured to perform start-up in response to a start-up control signal, and an air conditioner 37 configured to perform air-conditioning control in response to an air-conditioning control signal.

The system for controlling an air conditioner for a vehicle according to an embodiment of the present invention performs air-conditioning control based on environmental information generated by the sensor group 31 in response to the remote start-up of the user terminal 1 or the timer 33. The system may perform preliminary air-conditioning control in preparation for environmental information and an air-conditioning target regardless of remote start-up by the user terminal 1 or the timer 33.

Figure 4:
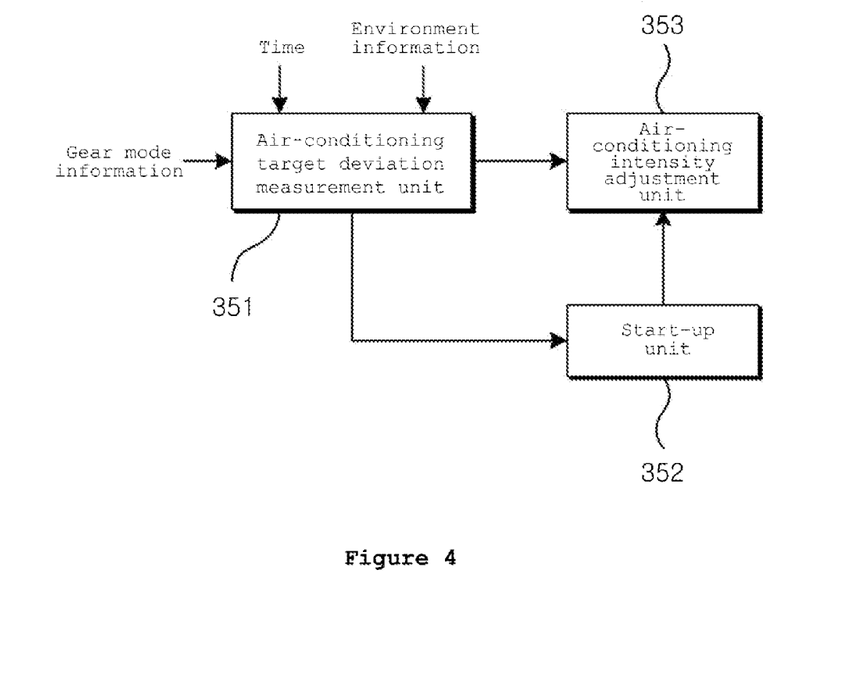
FIG. 4 shows the configuration of a control unit according to an embodiment of the present invention.

FIG. 4 shows the configuration of a control unit according to an embodiment of the present invention.

Referring to FIG. 4, the control unit 35 according to an embodiment of the present invention includes an air-conditioning target deviation measurement unit 351 configured to measure air-conditioning target deviation based on environmental information, time information and gear mode information, a start-up unit 352 configured to generate a start-up control signal when air-conditioning target deviation is a set value or more, and an air-conditioning intensity adjustment unit 353 configured to generate an air-conditioning control signal in response to start-up and control the intensity of air-conditioning when air-conditioning target deviation is a set value or more.

The control unit 35 configured as described above according to an embodiment of the present invention performs normal air-conditioning control in response to remote start-up or automatic start-up when air-conditioning target deviation is less than a set value, and performs air-conditioning control in addition to start-up control when air-conditioning target deviation is a set value or more. In this case, the intensity of air-conditioning control is controlled. That is, for example, if temperature is higher than or lower than a set value, the control unit 35 performs preliminary air-conditioning and simultaneously increases the intensity of air-conditioning so that the time taken to reach targeted air-conditioning is subsequently reduced in response to normal remote start-up or automatic start-up.

A method of controlling the air conditioner for a vehicle using the system configured as described above according to an embodiment of the present invention is described below.

Figure 5:
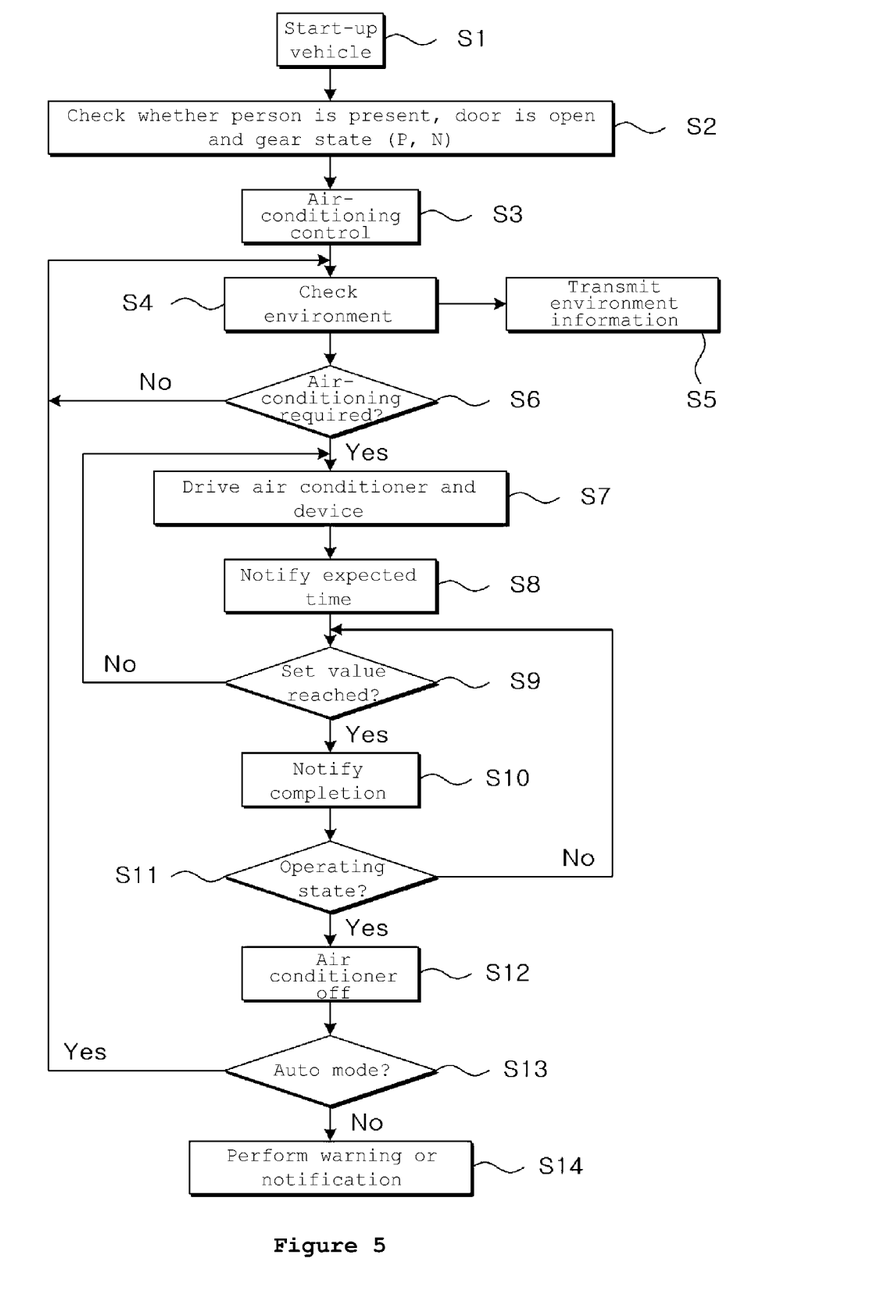
FIG. 5 is a flowchart of a method of controlling an air conditioner for a vehicle according to an embodiment of the present invention.

FIG. 5 is a flowchart of a method of controlling an air conditioner for a vehicle according to an embodiment of the present invention.

Referring to FIG. 5, when remote start-up is performed by the user terminal 1 (S1), the air conditioner 37 is automatically controlled (S3).

At this time, the control unit 35 checks whether a person is present within a vehicle, whether a door is open or not and a gear state in response to a remote start-up signal (S2). That is, if a person is present, a door is open or the gear state is not a parking mode or neutral mode, air-conditioning control may not be performed. Air-conditioning control may be performed when a person is present or a door is open depending on the setting of air-conditioning control. However, if the gear state is not the parking mode or the neutral mode, air-conditioning control cannot be performed because start-up is not performed.

Next, the control unit 35 checks an environment (S4). The checked environmental information may be transmitted to the user terminal 1 (S5).

If, as a result of the check of the environment, air-conditioning is required (S6), devices including the air conditioner 37 are controlled (S7). That is, a heater, the air conditioner, a hot wire, and a defog hot wire are driven.

The control unit 35 may transmit the time taken to reach a set value in response to the actuation of the air conditioner 37 and devices to the user terminal 1 (S8).

The control unit 35 checks whether the set value has been reached by the air conditioner 37 and the devices (S9).

If the state, such as air-conditioning, has reached the set value, the control unit 35 transmits a complete notification message to the user terminal 1 (S10).

Thereafter, when the state becomes a driving state (S11), control, such as air-conditioning, is stopped (S12).

If a user's manipulation or auto mode has been set (S13), the process proceeds to the process of checking an environment and the same process is repeated.

In this case, warning or notification may be performed for each hour or depending on a degree of change of environment (S14).

In the operation of the air conditioner 37, a current environment and target deviation may be determined and the intensity of air-conditioning conditions may be adjusted depending on the degree of the current environment and target deviation. That is, if a difference of a set value or more is generated between the current environment and the air-conditioning target, the intensity of air-conditioning conditions may be strongly controlled. If a difference of less than a set value is generated between the current environment and the air-conditioning target, the intensity of air-conditioning conditions may be weakly controlled.

Figure 6:
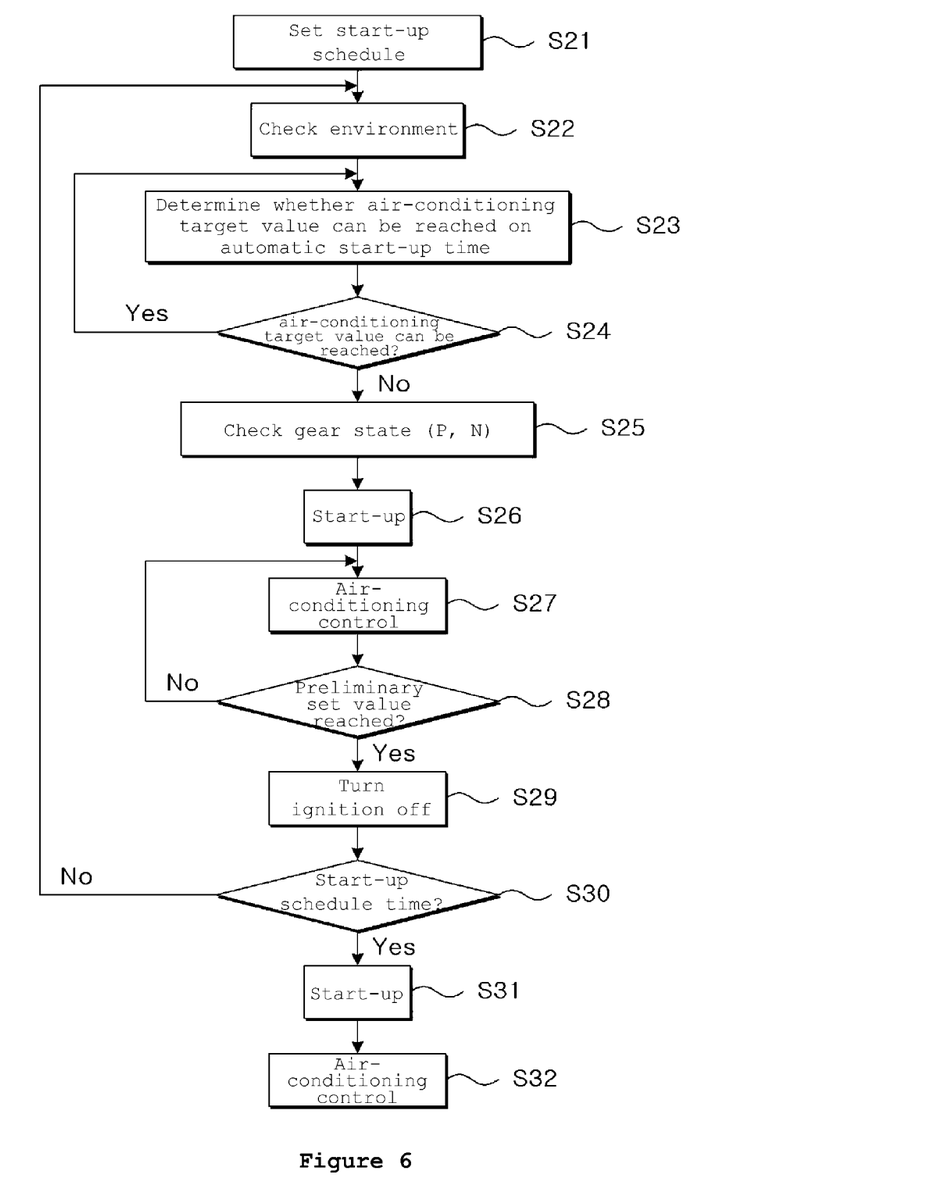
FIG. 6 is a flowchart of a preliminary air-conditioning control method according to an embodiment of the present invention.

FIG. 6 is a flowchart of a preliminary air-conditioning control method according to an embodiment of the present invention.

The technology described in FIG. 5 relates to a case where remote start-up is performed by a user or automatic start-up is performed on a set time.

In the present embodiment, if automatic start-up is performed, start-up is not performed on a set time, but may be previously performed depending on an environment state. That is, control may be performed based on an environment value rather than a set value.

Referring to FIG. 6, first, a user sets an automatic start-up time (S21).

The control unit 35 checks an environment (S22).

The control unit 35 checks whether the current environment can reach a required air-conditioning target value through automatic start-up on a set time by checking the environment (S23).

If it is checked that the required air-conditioning target value can be reached (S24), the control unit waits for the set time. The control unit repeats the process by continuously checking the environment. Thereafter, if there is no great change in the environment, automatic start-up will be performed on a preset time.

If it is checked that the required air-conditioning target value cannot be reached (S24), automatic start-up is performed (S26). That is, start-up is performed at a time earlier than the set time.

Start-up conditions must satisfy the least conditions on which start-up is performed only when the gear state is the parking mode and the neutral mode (S25).

When air-conditioning control is performed (S27), the control unit determines whether an air-conditioning target value has reached a preliminary set value (S28).

When the air-conditioning target value reaches the preliminary set value, the control unit stops the start-up (S29). When the air-conditioning target value does not reach the preliminary set value, the control unit continues to perform air-conditioning control. At this time, the intensity of air-conditioning control may be adjusted depending on target deviation.

Such a process may be continuously repeated prior to a scheduled start-up time.

When the scheduled start-up time is reached (S30), automatic start-up is performed (S31).

Air-conditioning control is performed in response to the automatic start-up (S32). In this case, the air-conditioning control may reach a required target value within a short time due to preliminary air-conditioning control.

In this case, the preliminary air-conditioning control is performed within a set time of the scheduled time. For example, if start-up has been scheduled at 8 o'clock, it may be applied from 7:30.

In an embodiment of the present invention, only air-conditioning control has been described, but the present invention may be identically applied to a seat hot wire, a handle hot wire and a defog hot wire. Control of the seat hot wire, handle hot wire and defog hot wire may also be performed along with air-conditioning control.

As described above, an optimum indoor temperature can be automatically controlled in addition to the remote start-up of the vehicle 3 using the user terminal 1 according to the IoT concept. Targeted air-conditioning can be rapidly reached through a preliminary multi-step process.

As described above, in accordance with the system and method for controlling an air conditioner for a vehicle according to the embodiments of the present invention, an air-conditioning target can be easily achieved according to a vehicle driving time because preliminary air-conditioning control is performed.

The technical spirit of the present invention has been described through some embodiments described above.

It is evident that a person having ordinary skill in the art to which the present invention pertains may modify or change the aforementioned embodiments in various ways from the writing of the present invention. Furthermore, although it is not explicitly shown or described, it is evident that a person having ordinary skill in the art to which the present invention pertains may modify the present invention in various forms including the technical spirit of the present invention from the writing of the present invention, which belongs to the scope of right of the present invention. The embodiments described with reference to the accompanying drawings have been described to describe the present invention, and the scope of right of the present invention is not limited to such embodiments.

What is claimed is:

1. A system for controlling an air conditioner for a vehicle, the system comprising:
   a sensor group configured to generate environmental information;
   a gear mode sensing unit configured to sense a gear mode;
   a timer configured to count time;
   a communication unit configured to receive a remote control signal and transmit air-conditioning control information;
   a control unit configured to generate a start-up control signal for a vehicle in response to the remote control signal or a set time, output or stop a start-up control signal in response to the gear mode, output an air-conditioning control signal when start-up is performed, perform transmission control through the communication unit by generating the air-conditioning control information, measure air-conditioning target deviation corresponding to the environmental information, and selectively perform preliminary air-conditioning control;
   a start-up device configured to perform start-up in response to the start-up control signal; and
   an air conditioner configured to perform air-conditioning control in response to the air-conditioning control signal,
   wherein, responsive to a determination, based on the environmental information generated by the sensor group, that a current environment is incapable of reaching a required air-conditioning target value through automatic start-up, the control unit is further configured to control the air conditioner to perform preliminary air-conditioning after start-up is performed.

2. The system of claim 1, wherein the control unit comprises:
   an air-conditioning target deviation measurement unit configured to measure air-conditioning target deviation based on the environmental information, time information and gear mode information;
   a start-up unit configured to generate the start-up control signal when the air-conditioning target deviation is a set value or more; and
   an air-conditioning intensity adjustment unit configured to generate the air-conditioning control signal in response to the start-up and adjust intensity of air-conditioning when the air-conditioning target deviation is the set value or more.

3. A method of controlling an air conditioner for a vehicle, the method comprising:
   collecting environmental information;
   determining whether a current environment is capable of reaching a required air-conditioning target value on a set time through automatic start-up based on the environmental information;
   performing start-up if the current environment is incapable of reaching the required air-conditioning target value through the automatic start-up; and
   performing preliminary air-conditioning in response to the start-up.

4. The method of claim 3, wherein the start-up is performed only when a gear state is a parking mode or a neutral mode.

5. The method of claim 3, wherein the preliminary air-conditioning is performed within a set time of the automatic start-up time.

6. The method of claim 3, wherein air-conditioning control is performed along with the start-up at the automatic start-up time.

* * * * *